A. J. PURDY.
MOTOR VEHICLE.
APPLICATION FILED JUNE 26, 1920.
1,384,087.
Patented July 12, 1921.
4 SHEETS—SHEET 1.
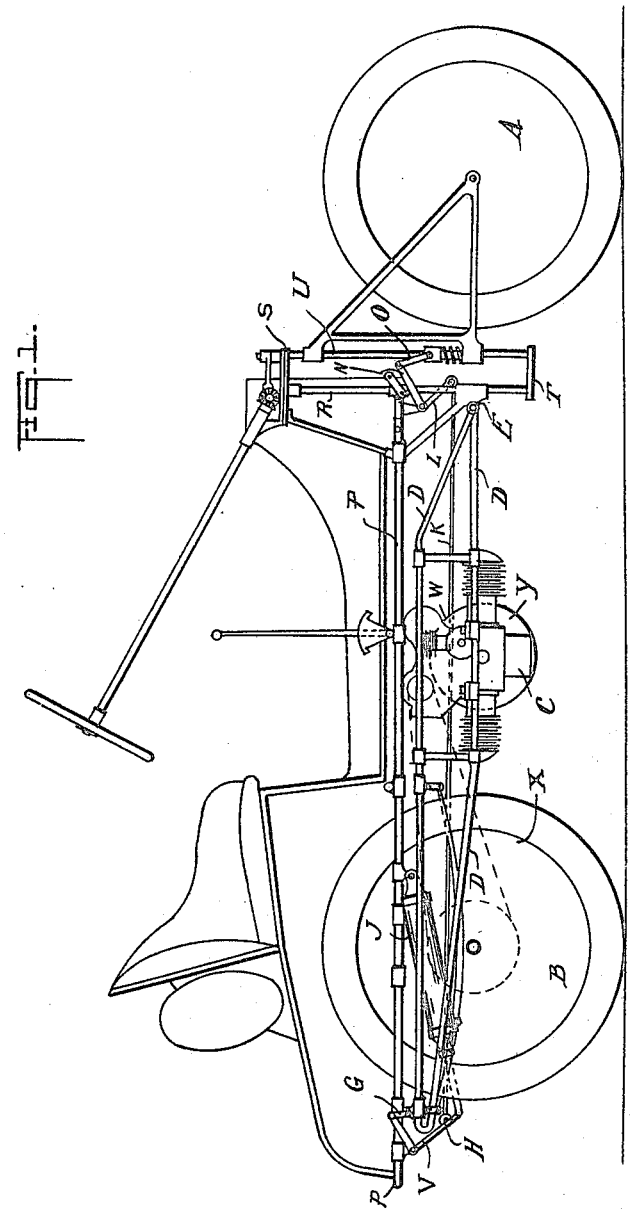

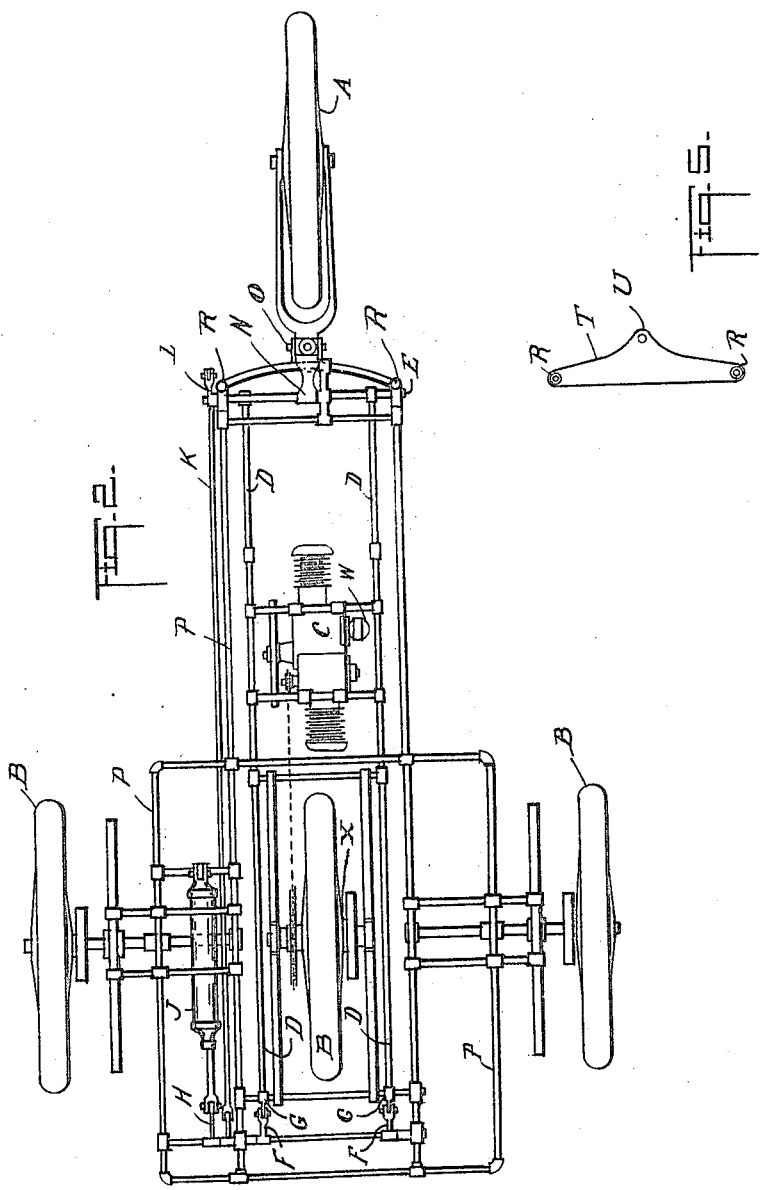

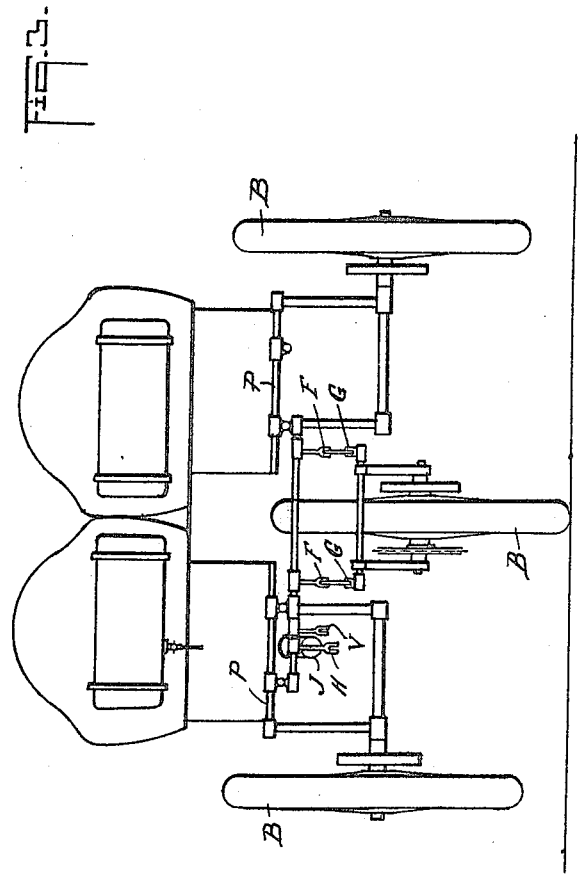

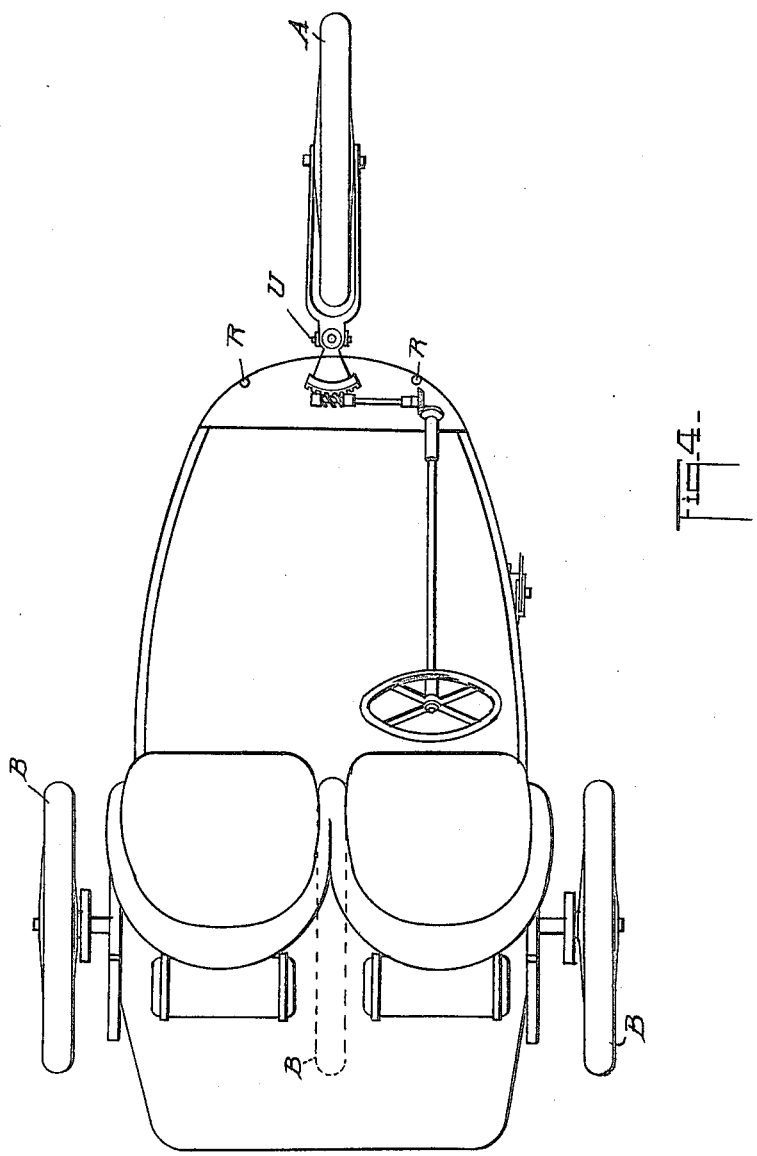

UNITED STATES PATENT OFFICE.

ANDREW J. PURDY, OF SAN FRANCISCO, CALIFORNIA.

MOTOR-VEHICLE.

1,384,087.   Specification of Letters Patent.   Patented July 12, 1921.

Application filed June 26, 1920. Serial No. 392,051.

*To all whom it may concern:*

Be it known that I, ANDREW JAMESON PURDY, a subject of Great Britain, residing at 568 Golden Gate avenue, San Francisco, in the county of San Francisco and State of California, have invented a new and useful Improvement in Motor - Vehicles, of which the following is a specification.

This invention relates to motor vehicles and consists of an arrangement by means of which a motor vehicle having the wheels placed as shown in the design may be made to run upon all four wheels or upon only two wheels when desired similar to a motor cycle.

The arrangement provides for three wheels at the rear all placed in the same straight center line transversely and only one wheel at the front. The central back wheel with the motor and entire power plant is carried on a separate frame independent of the main frame of the car and is movably attached to it by a hinge at the forward end to allow radial movement and by bell cranks at the rear end which are operated by means of a lever and air cylinder fitted on the main frame of the car, the whole weight of the motor and power plant being carried on this frame gives the required traction effect with the ground to the back wheel for propulsion under normal conditions. If more traction effect is required air pressure may be admitted to the cylinder which then brings the weight of the car itself upon the central wheels only to any extent required. Again if more air pressure be admitted to the cylinder the whole body of the car is lifted up until the side wheels are well clear of the ground and the car is running upon the central back and front wheels only and on a single track similar to a motor cycle. A connecting rod leads from the operating lever at the rear end of the frame to a corresponding lever at the front end which causes both ends to rise and fall simultaneously and maintains the body always in a horizontal position.

Referring to the drawings—Figure 1 is a sectional elevation of a motor car showing it resting on all four wheels. Fig. 2 is a plan view of the chassis. Fig. 3 is a rear end elevation with the car raised and running upon the two wheels only. Fig. 4 is a plan view of the body showing the steering arrangement. Fig. 5 is a plan view of bottom bracket for front wheel supports.

The same letter on each drawing denotes the same parts. A is the front wheel. B the position of three rear wheels. C is the motor and power plant. D is the secondary frame which carries the motor and back wheel and which is hinged at the pivot E and held by the bell cranks F and links G at the rear end. These cranks are operated by the lever H and the air cylinder J.

K is a connecting rod attached to a rear link connecting the rear crank lever V with the forward crank L pivoted on the frame P and which, through the arm N and the links O raise and lower the front of car simultaneous with the rear end.

P is the main frame of the car having the upright numbers R which carry the brackets S, T, for supporting the front wheel A and steering post U.

W is an air pump fitted on the motor gear case C which delivers air under pressure to the air tank X by means of flexible pipe from whence it is led to either end of cylinder J.

What I claim is:

1. In a motor vehicle of the character described, a main frame, a secondary frame with a supporting wheel intermediate the wheels of the main frame, the axles of the main and secondary frame wheels being on fixed different planes, the motor and power plant carried by said secondary frame, means movably connecting said frames, and means for raising the main frame and allowing the vehicle to run on the wheel of the secondary frame.

2. In a motor vehicle of the character described, a main frame, a secondary frame with a supporting wheel intermediate the wheels of the main frame, the axles of the main and secondary frame wheels being on fixed different planes, the motor and power plant carried by said secondary frame, means movably connecting said frames, and means for raising the main frame and allowing the vehicle to run on the wheel of the secondary frame, said raising means embodying bell crank levers and connecting rods.

3. In a motor vehicle of the character described, a main frame, a secondary frame with a supporting wheel intermediate the wheels of the main frame, the motor and power plant carried by said secondary frame, means movably connecting said frames, and means for raising the main frame and allowing the vehicle to run on the wheel of the secondary frame, said raising means embodying bell crank levers and connecting rods, and a cylinder with a piston and connection with one of said bell crank levers.

ANDREW J. PURDY.

Witnesses:
 FLETCHER F. S. KELSEY,
 CHAR's WM. H. WALKER.